US006412726B2

United States Patent
Inana et al.

(10) Patent No.: US 6,412,726 B2
(45) Date of Patent: Jul. 2, 2002

(54) SUPPLY MAGAZINE FOR RECORDING MATERIAL ROLL AND HAVING CODE READER

(75) Inventors: Katsuya Inana; Fuyuki Inui, both of Saitama (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 16 days.

(21) Appl. No.: 09/752,529

(22) Filed: Jan. 3, 2001

(30) Foreign Application Priority Data

| Jan. 5, 2000 | (JP) | 2000-005227 |
| Jan. 7, 2000 | (JP) | 2000-001927 |
| Sep. 26, 2000 | (JP) | 2000-292607 |

(51) Int. Cl.[7] .............................................. B65H 18/00
(52) U.S. Cl. ................ 242/348.4; 242/563; 242/599.1; 242/598.3
(58) Field of Search .......................... 242/348.4, 563, 242/599.1, 598.3

(56) References Cited

U.S. PATENT DOCUMENTS

| 2,631,790 A | * | 3/1953 | Wheldon ...................... 242/563 |
| 4,792,105 A | * | 12/1988 | Imaseki ....................... 242/68.4 |
| 4,913,367 A | * | 4/1990 | Hata ............................. 242/57 |
| 5,049,913 A | * | 9/1991 | Pagano et al. ............... 354/275 |
| 5,740,977 A | * | 4/1998 | Kaya ......................... 242/348.3 |
| 5,833,160 A | * | 11/1998 | Enomoto et al. ............ 242/348 |
| 5,911,380 A | * | 6/1999 | Shiba .......................... 242/348 |
| 6,254,023 B1 | * | 7/2001 | Mochizuki et al. ......... 242/348.4 |
| 6,334,587 B1 | * | 1/2002 | Roder .......................... 242/563 |

FOREIGN PATENT DOCUMENTS

| JP | 5-147328 | 6/1993 | ............ B41J/29/48 |
| JP | 7-228417 | 8/1995 | ........... B65H/43/08 |

* cited by examiner

Primary Examiner—Donald P. Walsh
Assistant Examiner—Daniel K Schlak
(74) Attorney, Agent, or Firm—Sughrue Mion, PLLC

(57) ABSTRACT

A recording paper roll includes a tubular spool shaft having first and second end faces. Thermosensitive recording paper is wound about the tubular spool shaft in a roll form. A code is formed in the first end face. For use with the recording paper roll, a supply magazine includes two roll holders secured to the spool shaft. First and second support plates are arranged in an axial direction of the roll holder, and support the roll holder in a rotatable manner. Guide cutouts are formed in the first and second support plates, receive first and second ends of the roll holder, and move the roll holder in a predetermined direction according to a decrease in a diameter of the recording material roll in use of the recording material. A code sensor reads the code from the first end face. A sensor shifter constituted by a depression portion moves the code sensor in the predetermined direction with the two roll holders.

20 Claims, 10 Drawing Sheets

SUPPLY MAGAZINE FOR RECORDING MATERIAL ROLL AND HAVING CODE READER

BACKGROUND OF THE INVENTION

1. Field of the Invention

The present invention relates to a supply magazine for containing a recording material roll. More particularly, the present invention relates to a supply magazine which are used with a recording material roll with a code represent information, and in which the code can be read reliably.

2. Description Related to the Prior Art

A photographic printer or thermal printer is used with a recording paper roll, which include a tubular spool shaft and such recording paper wound about the tubular spool shaft as photographic paper or thermosensitive recording paper of a great length. After the printer operation, the recording paper is cut into each piece of a predetermined size. The recording paper has photosensitivity or thermosensitivity. A supply magazine is used with the recording paper, and has characteristics of shielding moisture and light. A printer is loaded with the recording paper roll by setting the supply magazine in the printer.

To set the recording paper roll into the supply magazine, two roll holders are mounted to respectively ends of the tubular spool shaft. Each of the roll holders includes a holder core and a bearing member. The holder core has a cylindrical shape and insertable into the shaft end. The bearing member is engageable with a guide member in the supply magazine. A flange is formed with an edge of the holder core, contacts an end face of the tubular spool shaft, and prevents the roll holders from entry into an inner position of the tubular spool shaft.

The supply magazine includes a magazine body and a magazine lid. The magazine body is formed from material with characteristics of shielding moisture and light. The magazine lid is openable for inserting the recording paper roll into the magazine body. A supply roller is disposed in the magazine body. An outermost turn of the recording paper roll is pressed against the supply roller. When the supply roller is rotated by the printer, the recording paper roll is rotated, to exit the recording paper through a slot of the magazine body toward a recording position defined in the printer.

The recording paper changes in recording density according to sensitivity. Furthermore, an image to be recorded to an ordinary type of the recording paper is generally different from that to be recorded to a sticker type of the recording paper. Thus, there is a suggested system in which a code is predetermined for the recording paper and prerecorded on an end face of the tubular spool shaft of the recording paper roll to represent information of a type, thermosensitivity, manufacturer's name of the recording paper. A code reader is incorporated in the printer, and reads the code. As the printer is loaded with the recording paper roll by use of the supply magazine, the code reader is disposed inside the supply magazine.

There are various known devices for detecting a remaining amount of the recording paper roll. JP-A 07-228417 discloses detection of an amount of shifting of a member shiftable in contact with the outermost turn of the recording paper roll. JP-B 2823979 discloses a use of a sensing lever changeable in the angle according to the diameter of the recording paper roll.

In the supply magazine described above, the outer turn of the recording paper roll contacts the supply roller. When a diameter of the recording paper roll decreases by use of the recording paper, the tubular spool shaft moves toward the supply roller. Although the code can be read directly after inserting the recording paper roll into the supply magazine, the code cannot be read from the recording paper roll when the tubular spool shaft is moved by the decrease in the diameter of the recording paper roll.

If the recording paper roll is inserted in the supply magazine obliquely, there occurs a change in the distance between the end face of the tubular spool shaft and a sensor in the code reader in the course of rotation of the recording paper roll. If a length of the tubular spool shaft is irregular, the sensor distance changes according to a set state of the recording paper roll. An output level from the sensor increases or decreases to cause an error in the reading.

The remainder detecting device according to the prior art measures the shifted amount of the member in contact with the recording paper roll. If there is looseness in the recording paper roll, there occurs an error in the detected remaining amount of the recording paper roll To set the recording paper roll into the supply magazine, the roll holders are mounted on the ends of the tubular spool shaft of the recording paper roll. However, it is likely that a flange of the roll holders covers the code, and that the code cannot be read successfully. It is conceivable that the flange may be eliminated from the roll holders in the code reader for the purpose of reading the code. However, the tubular spool shaft moves in an unwanted manner. The recording paper is fed in a manner offset in the width direction.

SUMMARY OF THE INVENTION

In view of the foregoing problems, an object of the present invention is to provide a recording material supply magazine which is used with a recording material roll with a code represent information, and in which the code can be read reliably irrespective of a state of the roll.

Another object of the present invention is to provide a recording material supply magazine in which the code can be read reliably by easy access to the end face having the code.

In order to achieve the above and other objects and advantages of this invention, a supply magazine contains a recording material roll including a tubular spool shaft having first and second end faces, recording material wound about the tubular spool shaft in a roll form, and a code formed in at least the first end face. At least one roll holder is secured to the spool shaft. First and second support plates are arranged in an axial direction of the roll holder, for supporting the roll holder in a rotatable manner. A guide mechanism is formed with the first and second support plates, for receiving first and second ends of the roll holder, and for moving the roll holder in a predetermined direction according to a decrease in a diameter of the recording material roll in use of the recording material. A code sensor reads the code from the first end face. A sensor shifter moves the code sensor in the predetermined direction with the roll holder.

Furthermore, a supply roller is disposed in a position defined in the predetermined direction from the first and second support plates, for rotating in unwinding and winding directions in contact with an outside of the recording material roll, to feed the recording material.

The at least one roll holder comprises first and second roll holders for being fitted partially in openings in respectively the first and second end faces. The guide mechanism further includes first and second guide cutouts, formed in respectively the first and second support plates, for extending toward the supply roller, to receive insertion of the first and second roll holders in a slidable manner.

Each of the first and second roll holders includes a holder core for being fitted in each of the openings in the first and second end faces. A bearing member is secured to the holder core, and inserted in each of the first and second guide cutouts.

The sensor shifter includes a sensor holder for supporting the code sensor. A depression portion is formed with the first roll holder, for moving the sensor holder in the predetermined direction.

The sensor shifter further includes a guide shaft for extending in the predetermined direction, and for keeping the sensor holder slidable thereon.

Furthermore, a sensor bias mechanism biases the sensor holder in reverse to the predetermined direction. First and second core retention levers push respectively the first and second roll holders in the predetermined direction against the sensor bias mechanism.

The guide shaft is secured to the first support plate.

Furthermore, a position regulator keeps the code sensor at a predetermined distance from the first end face.

The position regulator includes a sliding member, secured to the sensor holder, slidable toward and away from the tubular spool shaft, for supporting the code sensor. A guide roller or ball is secured to the sliding member in a rotatable manner, for contacting the first end face or one end face of the recording material roll.

The position regulator further includes a bias mechanism for biasing the sliding member toward the first end face.

The position regulator further includes a slide guide mechanism for keeping the sliding member slidable on the sensor holder.

The slide guide mechanism includes a tubular portion formed with the sensor holder. The sliding member is a sliding rod inserted in the tubular portion in a slidable manner.

The bias mechanism is a coil spring disposed in the tubular portion.

Furthermore, a position detector is secured to the sensor holder or the first roll holder, for measuring a shifted position of the recording material roll with reference to the predetermined direction. An information generator generates information of a remaining amount of the recording material according to the shifted position.

The position detector includes a potentiometer.

According to another aspect of the invention, a supply magazine for containing a recording material roll includes first and second roll holders for being fitted partially in openings in respectively the first and second end faces. A first flange is formed to project from at least the first roll holder, opposed to the first end face, for preventing the tubular spool shaft from offsetting in an axial direction. A code sensor reads the code from the first end face. An inclined face is formed in the first flange, for facilitating an access of the code sensor to the first end face.

The inclined face is opposed to the first end face and inclined away from the first end face with reference to a radial direction of the first flange.

Furthermore, a second flange is formed with the second roll holder, opposed to the second end face, for preventing the tubular spool shaft from offsetting in the axial direction.

Furthermore, a magazine body has a magazine opening, for accommodating the recording material roll, the first and second roll holders and the code sensor. A magazine lid openably closes the magazine opening.

According to still another aspect of the invention, a roll holder for supporting a recording material roll includes a holder core for being fitted partially in an opening in the first end face. A flange is formed to project from at least the holder core, opposed to the first end face, for preventing the tubular spool shaft from offsetting in an axial direction. An inclined face is formed in the flange, for facilitating an access to the first end face for reading the code.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
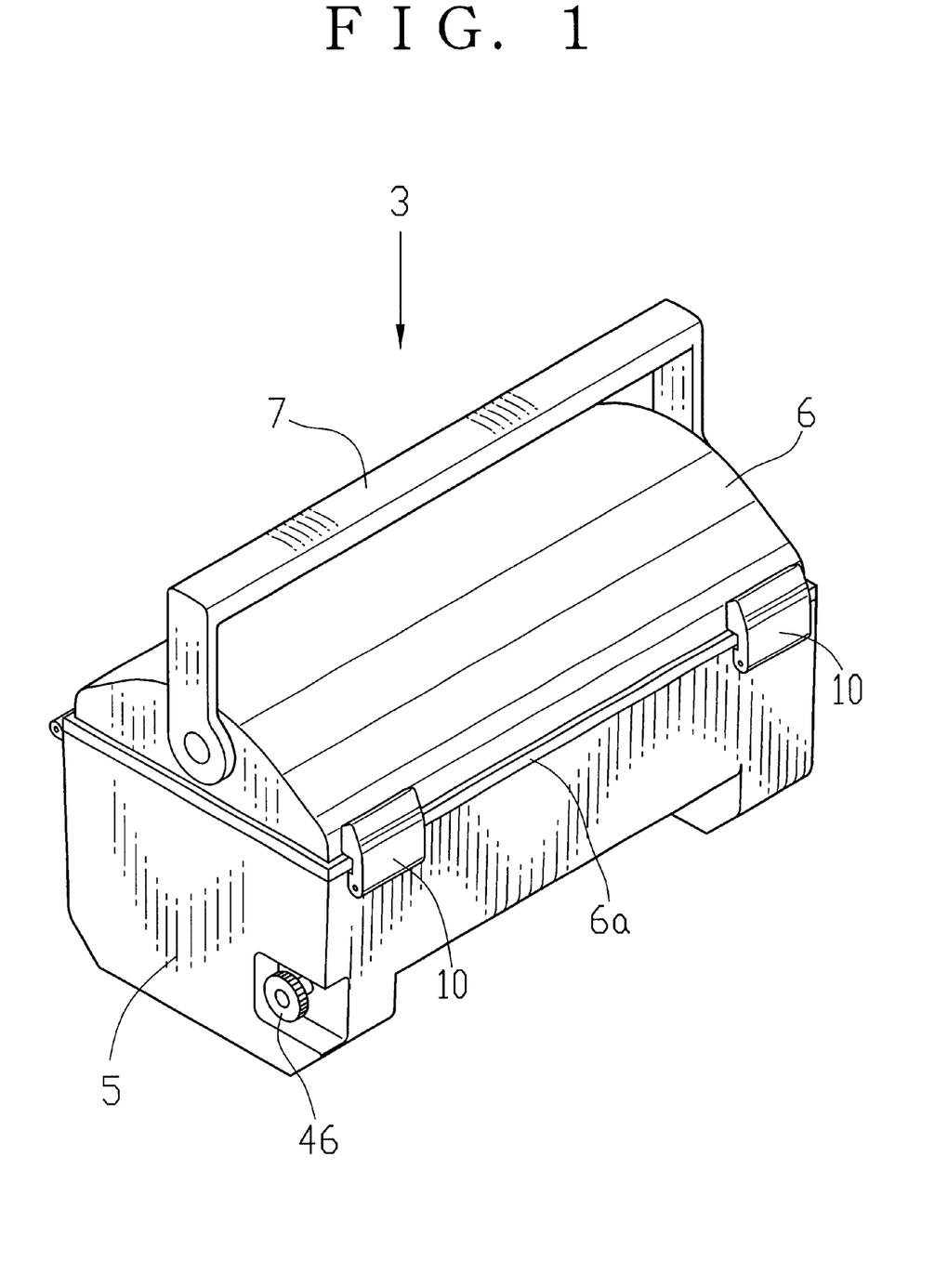
FIG. 1 is a perspective illustrating a recording paper supply magazine.

In FIG. 1, appearance of a supply magazine 3 is illustrated. The supply magazine 3 includes a magazine body 5 and a magazine lid 6 for closing the magazine body 5 in an openable manner. The magazine body 5 has nearly a semi-cylindrical shape. Both the magazine body 5 and the magazine lid 6 are formed from plastic material having characteristics of being moisture-proof and shielding light. A handle 7 is secured to the magazine lid 6 and grasped in loading a printer with the supply magazine 3.

Figure 2:
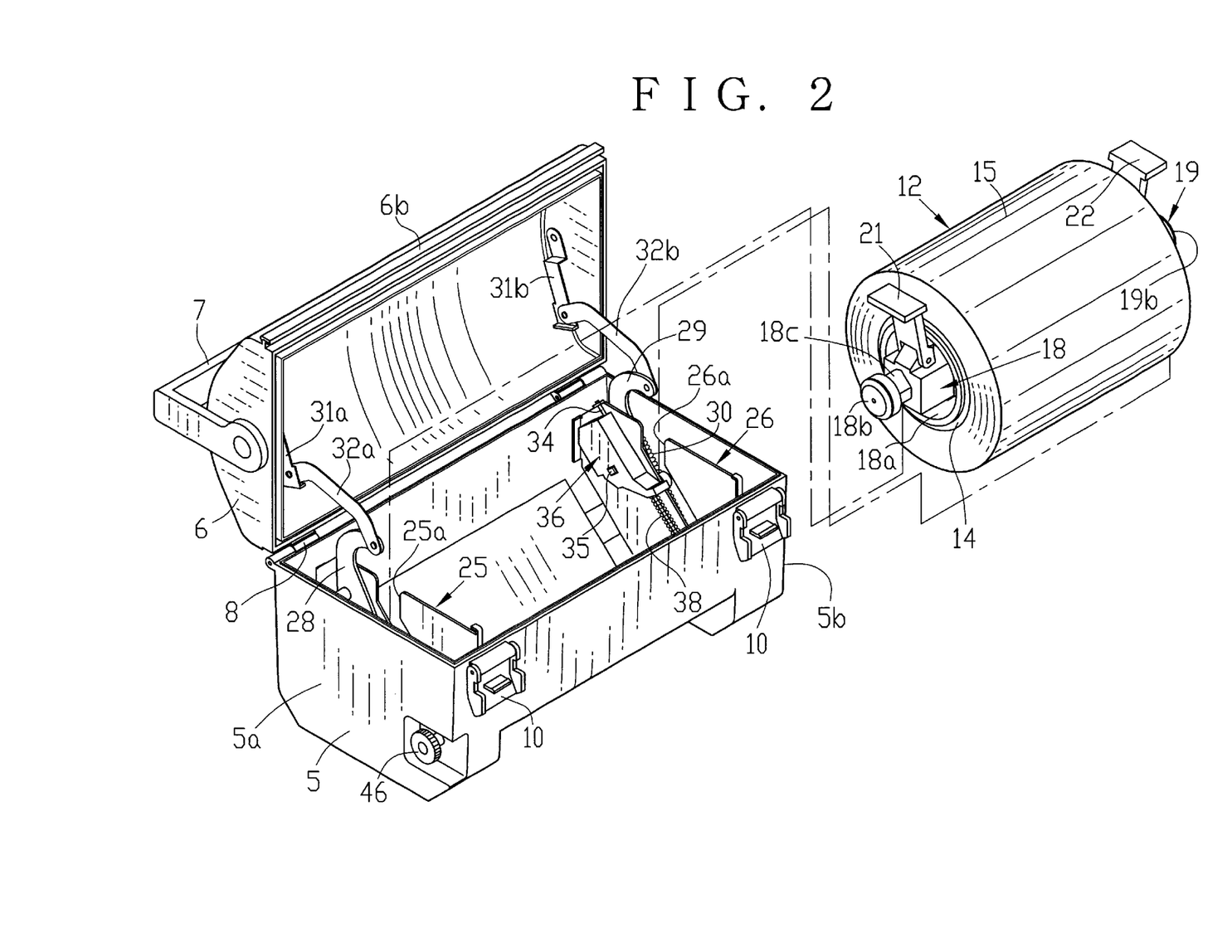
FIG. 2 is an exploded perspective illustrating the supply magazine with a recording paper roll on a roll holder.

In FIG. 2, a hinge 8 connects the magazine lid 6 to the magazine body 5 in pivotally movable manner for closing. A pair of locks 10 are disposed on a front edge of an upper opening of the magazine body 5. A ridge 6a is formed with the magazine lid 6. When the magazine lid 6 is closed as illustrated in FIG. 1, the locks 10 are engaged with the ridge 6a to keep the magazine lid 6 closed and prevent it from opening accidentally.

A recording paper roll 12 as recording material roll includes a tubular spool shaft 14 and color thermosensitive recording paper 15 as continuous recording material. The tubular spool shaft 14 is formed from paper, cardboard, plastic material, or the like. The recording paper 15 has a continuous form or strip form. A first roll holder 19 and a second roll holder 18 are secured to ends of the tubular spool shaft 14 before setting the recording paper roll 12 into the supply magazine 3.

Figure 3:
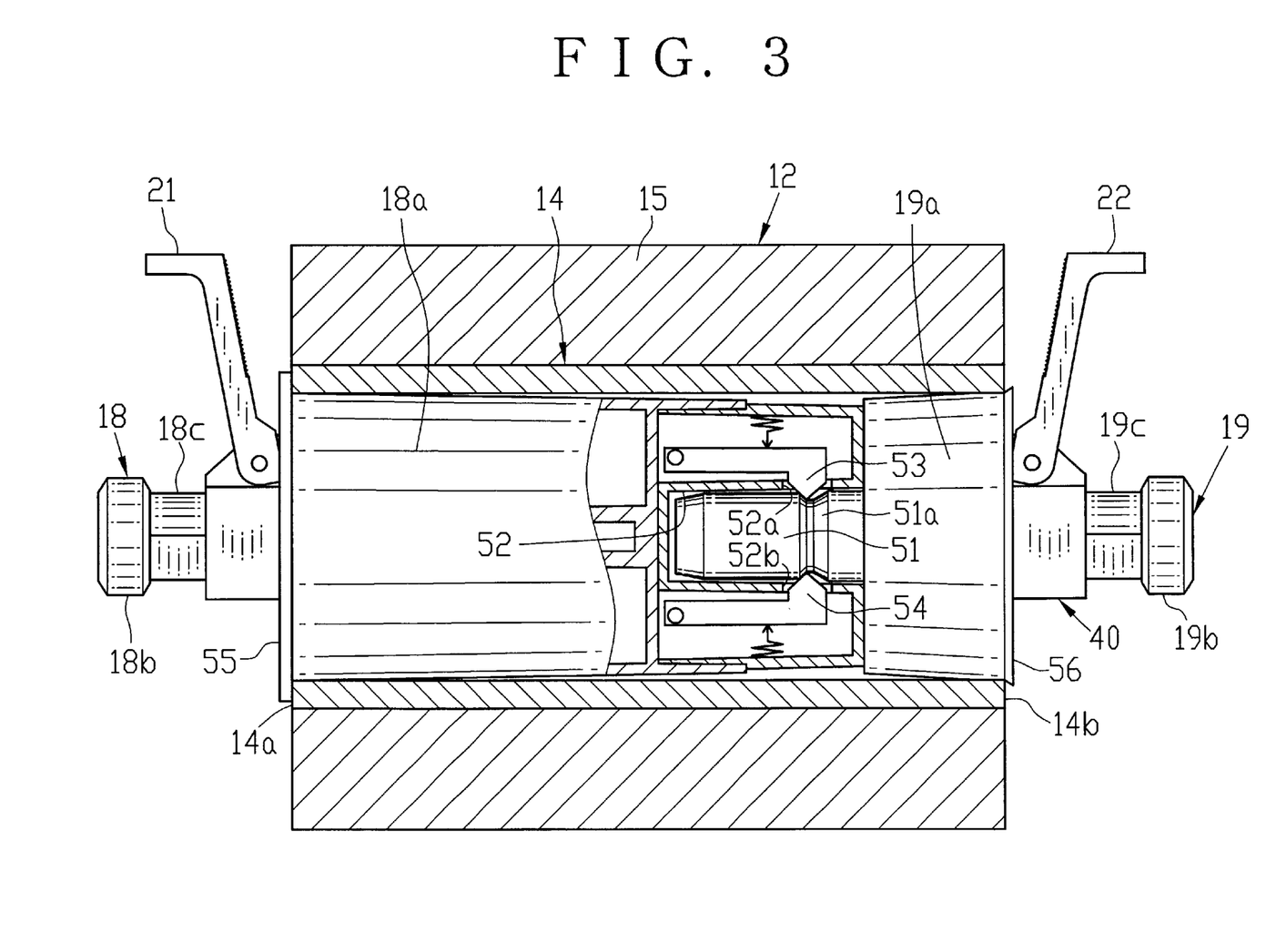
FIG. 3 is a vertical section illustrating the recording paper roll and the roll holders.

In FIG. 3, the first and second roll holders 19 and 18 are depicted. The second roll holder 18 includes a holder core 18a and a bearing member 18b. The holder core 18a is fitted in one end of the tubular spool shaft 14. The bearing member 18b is rotatable on the holder core 18a, and protrudes toward a position on the side of the recording paper roll 12. Similarly, the first roll holder 19 includes a holder core 19a and a bearing member 19b. The handles 21 and 22 are secured to the bearing members 18b and 19b in a rotatable manner, and grasped at the time of setting the recording paper roll 12 into the supply magazine 3.

The holder cores 18a and 19a have a shape of which a diameter increases in a direction toward the bearing members 18b and 19b to come up to a diameter of an inner surface of the tubular spool shaft 14. A columnar projection 51 is formed with a central portion of the holder core 19a. A sleeve 52 is formed with a central portion of the holder core 18a to receive the columnar projection 51. A groove 51a is formed in a peripheral surface of the columnar projection 51 in a circular manner. A pair of latch claw portions 53 and 54 are disposed inside the holder core 18a and engageable with the groove 51a. Holes 52a and 52b are formed in the wall of the sleeve 52. Springs are associated with the latch claw portions 53 and 54 and bias those to protrude toward the inside of the sleeve 52 through the holes 52a and 52b.

When the holder cores 18a and 19a are inserted into the ends of the tubular spool shaft 14, the columnar projection 51 of the holder core 19a becomes inserted in the sleeve 52 of the holder core 18a. The latch claw portions 53 and 54 are engaged with the groove 51a of the columnar projection 51 to couple the holder cores 18a and 19a with each other. A first flange 56 and a second flange 55 are formed with respectively the holder cores 19a and 18a. The second flange 55 is disposed close to the bearing member 18b, extends from the cylindrical portion of the holder core 18a, and contacts a second end face 14a of the tubular spool shaft 14. The first flange 56 is disposed close to the bearing member 19b, and contacts an edge line of a first end face 14b of the tubular spool shaft 14. Therefore, the holder cores 18a and 19a are firmly secured to the tubular spool shaft 14.

Figure 4:
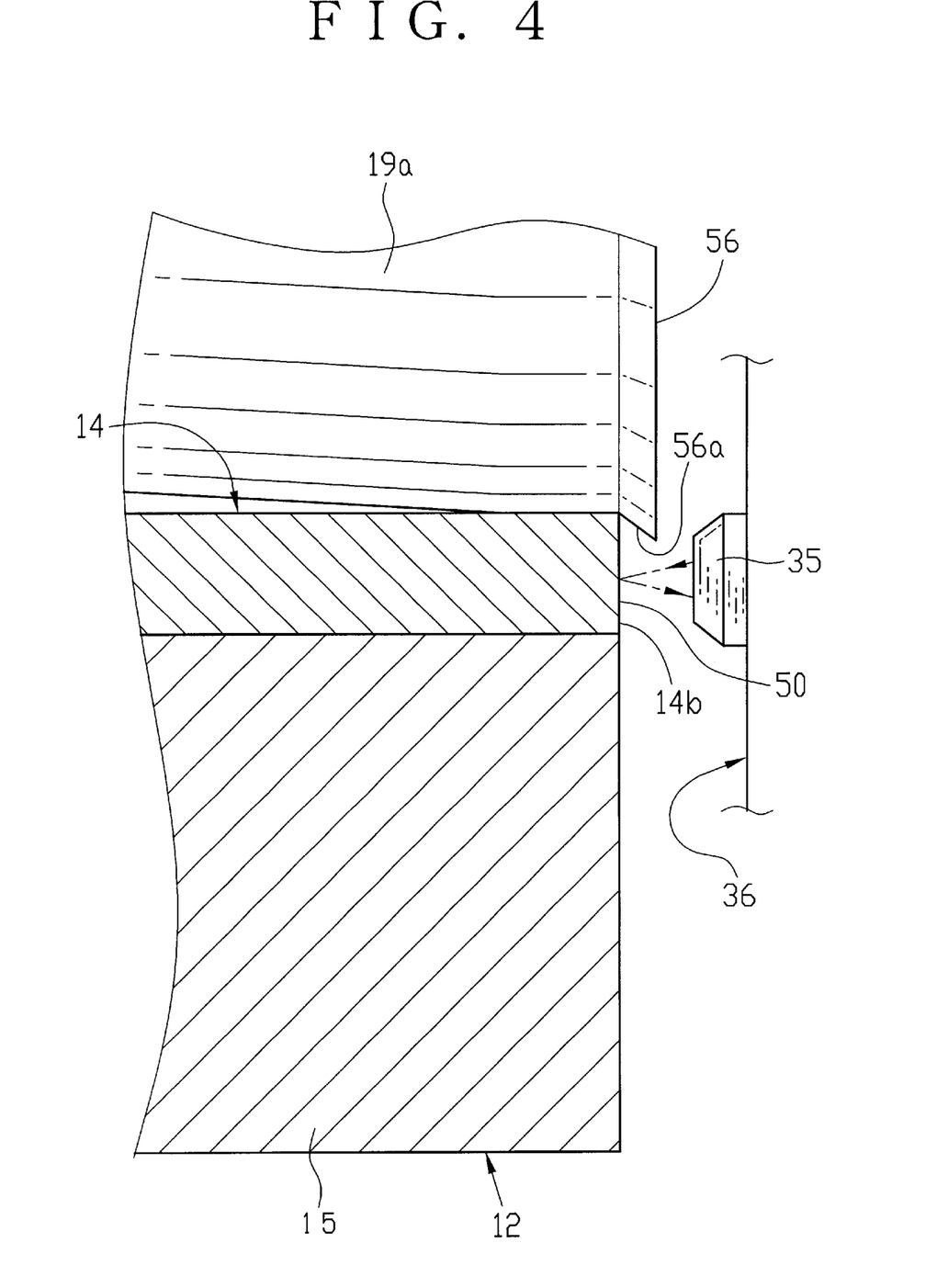
FIG. 4 is an explanatory view in elevation and section, illustrating a reading sensor and the recording paper roll.

In FIG. 4, an inclined surface 56a is formed with the first flange 56 and causes the first end face 14b of the tubular spool shaft 14 not be blocked. A code 50 is disposed in the first end face 14b. A code sensor 35 or reader of a reflection type is enabled by the inclined surface 56a to access the code 50 and read it in a reliable manner. See FIG. 6.

The magazine body 5 has lateral walls 5b and 5a, inside which a first support plate 26 and a second support plate 25 are disposed. First and second guide cutouts or grooves 26a and 25a are formed in the first and second support plates 26 and 25 for receiving small-diameter portions 19c and 18c of the bearing members 19b and 18b. See FIGS. 5A, 5B and 3. Each of the first and second guide cutouts 26a and 25a has upper and lower sections. The upper section is defined by substantially vertical edges with reference to the lower surface of the magazine body 5. The lower section is defined by edges inclined at 45 degrees. First and second core retention levers 29 and 28 or connection levers are secured to outer surfaces of the first and second support plates 26 and 25 in a rotatable manner.

Figure 5A:
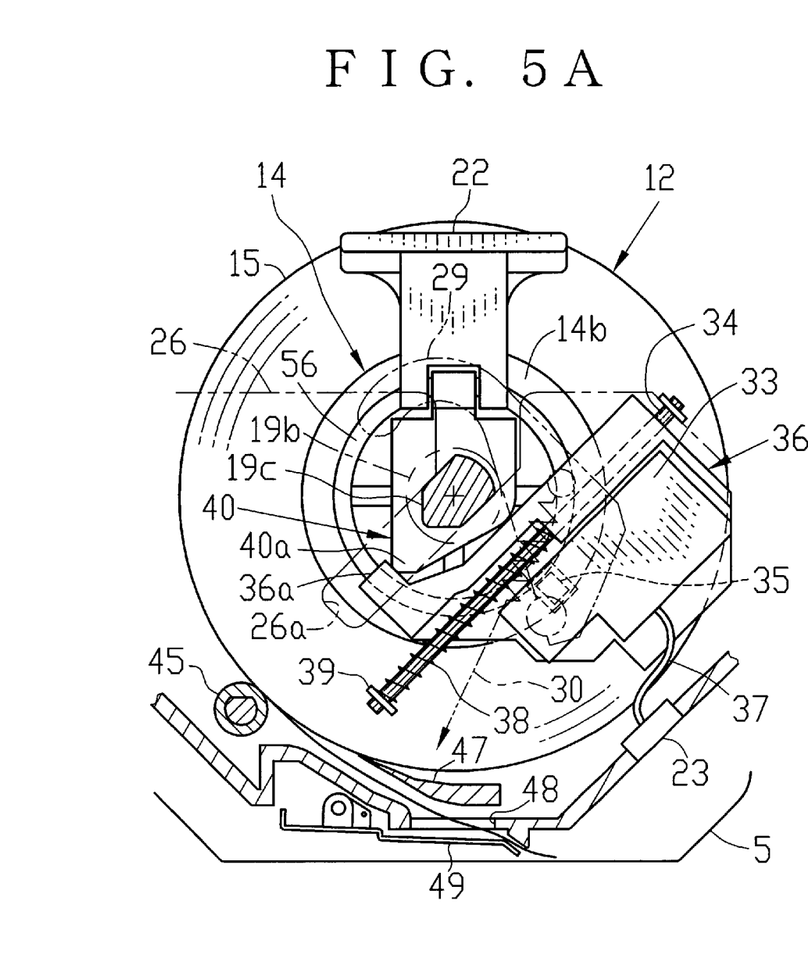
FIG. 5A is an explanatory view in elevation illustrating a first roll holder with a roll end face and portions of the supply magazine.
Figure 5B:
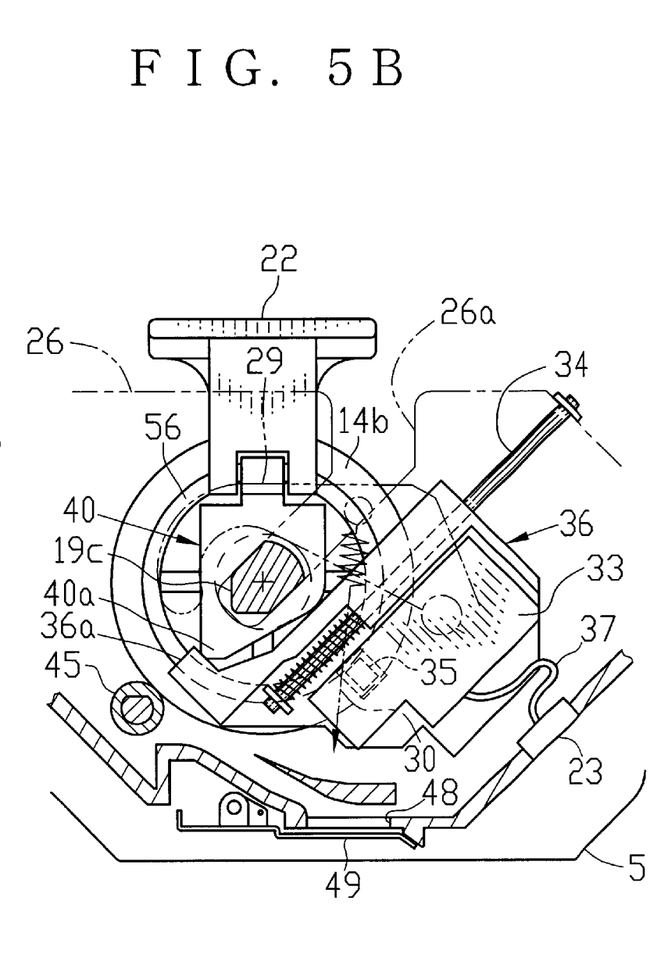
FIG. 5B is an explanatory view in elevation illustrating the same as FIG. 5A but in which a diameter of the recording paper roll has decreased.

There is a coil spring 30 included in a pair of coil springs, which bias the first and second core retention levers 29 and 28 toward a lower wall of the magazine body 5. Levers 32b and 32a are connected with the first and second core retention levers 29 and 28. Also, levers 31a and 31b are connected with the levers 32a and 32b, and disposed inside the magazine lid 6. The mechanism in combination with those levers shifts the first and second core retention levers 29 and 28 in an upper position when the magazine lid 6 is open, and shifts the first and second core retention levers 29 and 28 in a lower position when the magazine lid 6 is closed. The first and second core retention levers 29 and 28, when in the upper position, release the bearing members 19b and 18b from retention, and when in the lower position, retain the bearing members 19b and 18b.

A guide shaft 34 is secured to an inner surface of the first support plate 26 directed to the magazine center and extends in parallel to the inclined edges of the first guide cutout 26a. A sensor holder 36 in a sensor shifter is supported on the guide shaft 34 in a slidable manner, and holds the code sensor 35. A sensor bias coil spring 38 as sensor bias mechanism is disposed along a lower part of the guide shaft 34, and biases the sensor holder 36 upwards. A stopper ring 39 is so disposed that the sensor bias coil spring 38 is between the stopper ring 39 and the sensor holder 36. See FIGS. 5A and 5B. Note that the force of bias of the sensor bias coil spring 38 is lower than that of the coil spring 30.

In FIGS. 5A and 5B, a relationship between the recording paper roll 12 and the sensor holder 36 in the magazine body 5 is depicted. A printed circuit board 33 is fixedly secured to the sensor holder 36, and provided with the code sensor 35. A connection cable 37 is a line from the printed circuit board 33 to a connector 23. The printed circuit board 33 is electrically connected by the connection cable 37 and the connector 23 to a control unit in the printer when the supply magazine 3 is set in a chamber in the printer.

The small-diameter portion 19c in the bearing member 19b is insertable into the first guide cutout 26a, and has such a shape as viewed in section that there are a lower corner at a right angle, two side lines both parallel with inclined edges of the first guide cutout 26a, and an arc disposed opposite to the lower corner. Thus, the small-diameter portion 19c is moved down into an open end of the first guide cutout 26a substantially in a vertical direction at first, and then is moved through an inclined section of the first guide cutout 26a straight without turning with reference to the first guide cutout 26a. Note that a combination of the small-diameter portion 18c and the second guide cutout 25a is structurally the same as that of the small-diameter portion 19c and the first guide cutout 26a. Also, the sensor holder 36 has a driven projection 36a. A depression portion 40 in the sensor shifter is formed with a portion of the bearing member 19b close to the holder core 19a. A claw 40a projects from the depression portion 40, and engageable with the driven projection 36a.

A supply roller 45 is disposed close to a lower wall of the magazine body 5 and in an extension of the inclined edges of the first guide cutout 26a, and is covered by a rubber tube. The outermost turn of the recording paper roll 12 inserted in the magazine body 5 is contacted by the supply roller 45. One axial end of the supply roller 45 protrudes to the outside of the magazine body 5. In FIGS. 1 and 2, a gear 46 is fixed to the outer end. When the chamber in the printer is loaded with the supply magazine 3, the gear 46 is meshed with a drive mechanism of the printer and rotated for feeding the recording paper 15.

A separator claw 47 is disposed on the inside of a lower portion of the magazine body 5, and separates a front edge of the recording paper 15 from the recording paper roll 12. An ejection slot 48 is formed through a lower wall of the magazine body 5, and exits the recording paper 15. A lower lid 49 is disposed outside the lower wall of the magazine body 5, openably closes the ejection slot 48, and is biased by a spring in a direction to close the ejection slot 48.

As the bearing member 19b is pushed down with an inclination by the first core retention lever 29, the claw 40a of the depression portion 40 at the bearing member 19b pushes down the driven projection 36a of the sensor holder 36 along the inclined section of the first guide cutout 26a. In the meantime, the sensor holder 36 is biased by the sensor bias coil spring 38 upward with an inclination along the guide shaft 34. The driven projection 36a of the sensor holder 36 is kept in contact with the claw 40a of the depression portion 40. Thus, the bearing member 19b and the sensor holder 36 are moved together along the first guide cutout 26a. As the force of bias of the coil spring 30 is higher than that of the sensor bias coil spring 38, the outermost turn of the recording paper roll 12 is pushed on the supply roller 45 no matter how the diameter of the recording paper roll 12 decreases in advancing the recording paper 15. The sensor holder 36 is moved by following the movement of the tubular spool shaft 14 toward the supply roller 45. The code sensor 35, therefore, is maintained at a predetermined distance to the first end face 14b of the tubular spool shaft 14 in a manner irrespective of the diameter of the recording paper roll 12.

Figure 6:
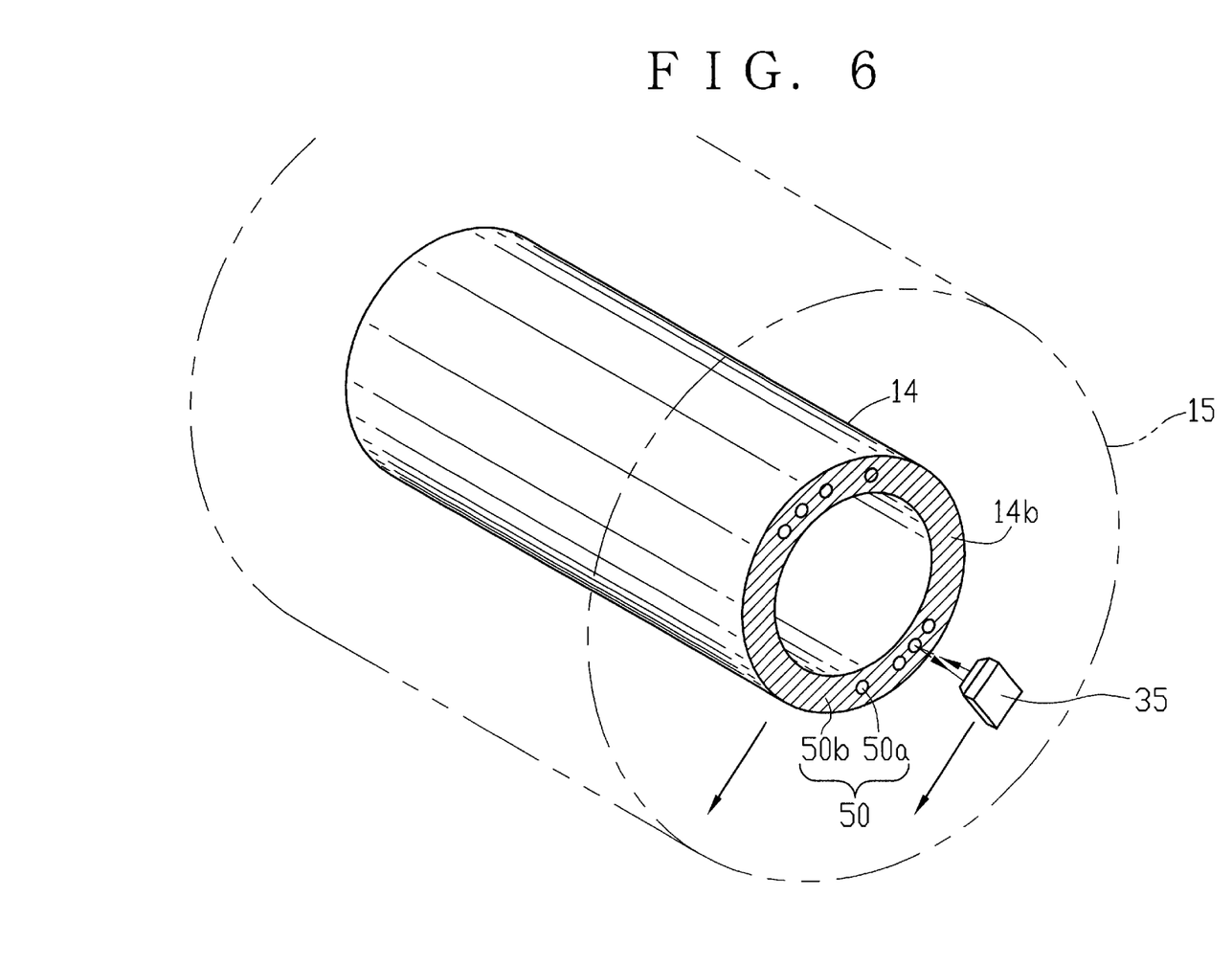
FIG. 6 is a perspective illustrating the reading sensor and a tubular spool shaft.

In FIG. 6, a relationship between the tubular spool shaft 14 and the code sensor 35 is illustrated. The first end face 14b of the tubular spool shaft 14 is provided with the code 50 representing information of a type, thermosensitivity, manufacturer's name, or the like of the recording paper 15. The code 50 has a form of a rotary bar code, and includes circular white regions 50a and a black region 50b. The circular white regions 50a have a high factor of reflection as white bars. The black region 50b has a low factor of reflection as black bars. The code sensor 35 is the reflection type including a light projector and a light receiver, and reads the code 50 while the recording paper roll 12 rotates.

Operation of the construction above is described now. To use the supply magazine 3, the holder cores 19a and 18a of the first and second roll holders 19 and 18 are initially inserted into ends of the tubular spool shaft 14 of the recording paper roll 12. The columnar projection 51 of the holder core 19a is inserted in the sleeve 52 of the holder core 18a. The latch claw portions 53 and 54 become engaged with the groove 51a, to connect the holder core 18a to the holder core 19a. Then the second flange 55 of the holder core 18a comes in contact with the second end face 14a of the tubular spool shaft 14. The first flange 56 of the holder core 19a comes in contact with the first end face 14b of the tubular spool shaft 14. Therefore, the first and second roll holders 19 and 18 are fixedly secured to the tubular spool shaft 14 without offsetting in the axial direction.

The magazine lid 6 is swung open next. The first and second core retention levers 29 and 28 are raised to the upper position by means of the levers 31a and 32a and the levers 31b and 32b. Upper ends of the first and second guide cutouts 26a and 25a become open. The handles 21 and 22 are grasped by both hands of a user, who inserts the recording paper roll 12 and the magazine body 5 in a vertical direction in dropping the small-diameter portions 19c and 18c of the bearing members 19b and 18b into the first and second guide cutouts 26a and 25a. Thus, the small-diameter portions 19c and 18c move down from the vertical section of the first and second guide cutouts 26a and 25a to their inclined section. The peripheral surface of the recording paper roll 12 comes in contact with the supply roller 45.

After this, the magazine lid 6 is swung and closed. The locks 10 are engaged with the ridge 6a to keep the magazine lid 6 locked on the magazine body 5. The first and second core retention levers 29 and 28 are moved down by the coil spring 30 and engaged with the bearing members 19b and 18b to press those against the supply roller 45. While the bearing members 18b and 19b are biased, the claw 40a of the depression portion 40 pushes the driven projection 36a of the sensor holder 36 toward the supply roller 45. As the sensor holder 36 is biased by the sensor bias coil spring 38 away from the supply roller 45, the bearing members 18b and 19b come to move together with the sensor holder 36. The first end face 14b of the tubular spool shaft 14 moves together with the code sensor 35. The code sensor 35 is kept opposed to the first end face 14b of the tubular spool shaft 14 irrespective of the diameter of the recording paper roll 12.

As the first flange 56 has the inclined surface 56a, the first flange 56 does not cover the code 50 on the first end face 14b in the tubular spool shaft 14. This is effective in reliable reading of the code 50 with the code sensor 35.

When the supply magazine 3 with the recording paper roll 12 is inserted in the roll chamber of the printer, the gear 46 comes in mesh with a drive mechanism of the printer. The connector 23 is connected with a connector of a control unit of the printer. Upon a start of the printing, the drive mechanism causes the gear 46 to rotate the supply roller 45 in a clockwise direction in FIGS. 5A and 5B. The recording paper roll 12 rotates counterclockwise. During the rotation, the code sensor 35 reads the code 50 from the first end face 14b of the tubular spool shaft 14. A sensor signal from the code sensor 35 is sent through the printed circuit board 33, the connection cable 37, the connector 23 and to the control unit of the printer, and used for control of driving of the thermal head. If the recording paper roll 12 is judged as unacceptable to the printer according to the sensor signal, then the printer generates a warning signal, discontinues the printing operation, and indicates information of requiring renewal of the recording paper roll 12.

Rotation of the recording paper roll 12 causes the separator claw 47 to separate the front end of the recording paper 15 from the recording paper roll 12, so the front end is moved toward the ejection slot 48. The front end of the recording paper 15 pushes open the lower lid 49, and moves through the ejection slot 48 and toward a printing station in the printer, In the course of using the recording paper 15, the diameter of the recording paper roll 12 decreases. However, the recording paper roll 12 is moved toward the supply roller 45 along the first and second guide cutouts 26a and 25a because the force of the coil spring 30 is higher than that of the sensor bias coil spring 38. The outermost turn of the recording paper roll 12 is pressed against the supply roller 45 constantly.

According to movement of the recording paper roll 12 to the supply roller 45, the sensor holder 36 also moves. This keeps the code sensor 35 opposed to the first end face 14b of the tubular spool shaft 14. Therefore, the code 50 can be read without errors even after the supply magazine 3 with the recording paper roll 12 is removed from and then reinserted into the chamber in the printer. Note that the code sensor 35 reads the code 50 at each time that a printing operation is started.

Note that, at the time of renewing the recording paper roll 12, the bearing members 18b and 19b are grasped by hands and drawn away from each other. The latch claw portions 53 and 54 are disengaged from the groove 51a to remove the first and second roll holders 19 and 18 from the tubular spool shaft 14.

If the recording paper roll 12 is set in an inclined state, a distance between the tubular spool shaft 14 and the code sensor 35 changes while the recording paper roll 12 rotates, to change an output level of the code sensor 35. Errors may occur in the reading. If there are variations in the length of the tubular spool shaft 14, there occur changes in the distance between the tubular spool shaft 14 and the code sensor 35. Also, the sensor distance changes when the first end face 14b of the tubular spool shaft 14 is curved.

Figure 7:
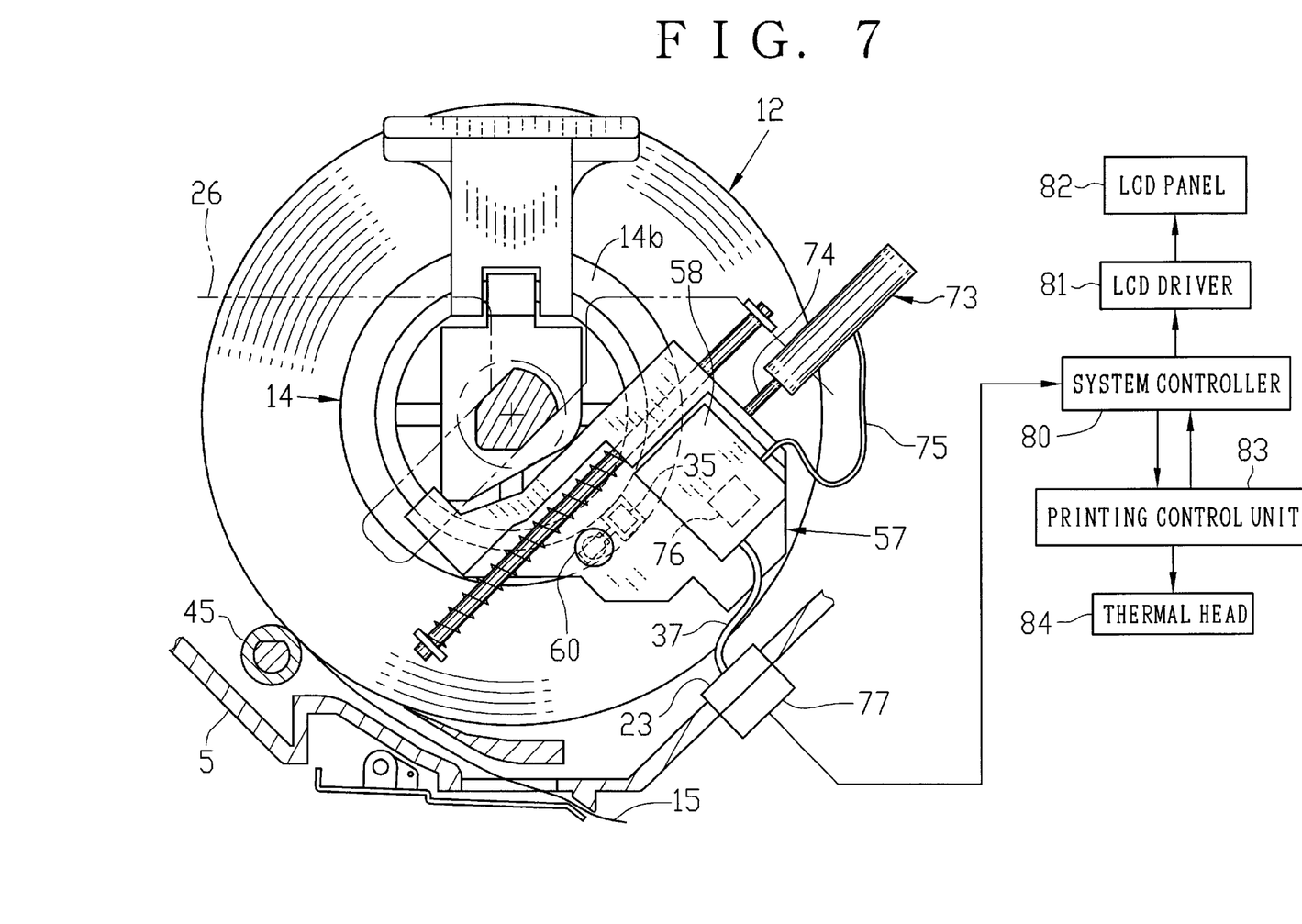
FIG. 7 is an explanatory view in elevation and diagram, illustrating the same as FIG. 5A and also relevant circuits for measuring remaining recording paper.
Figure 8:
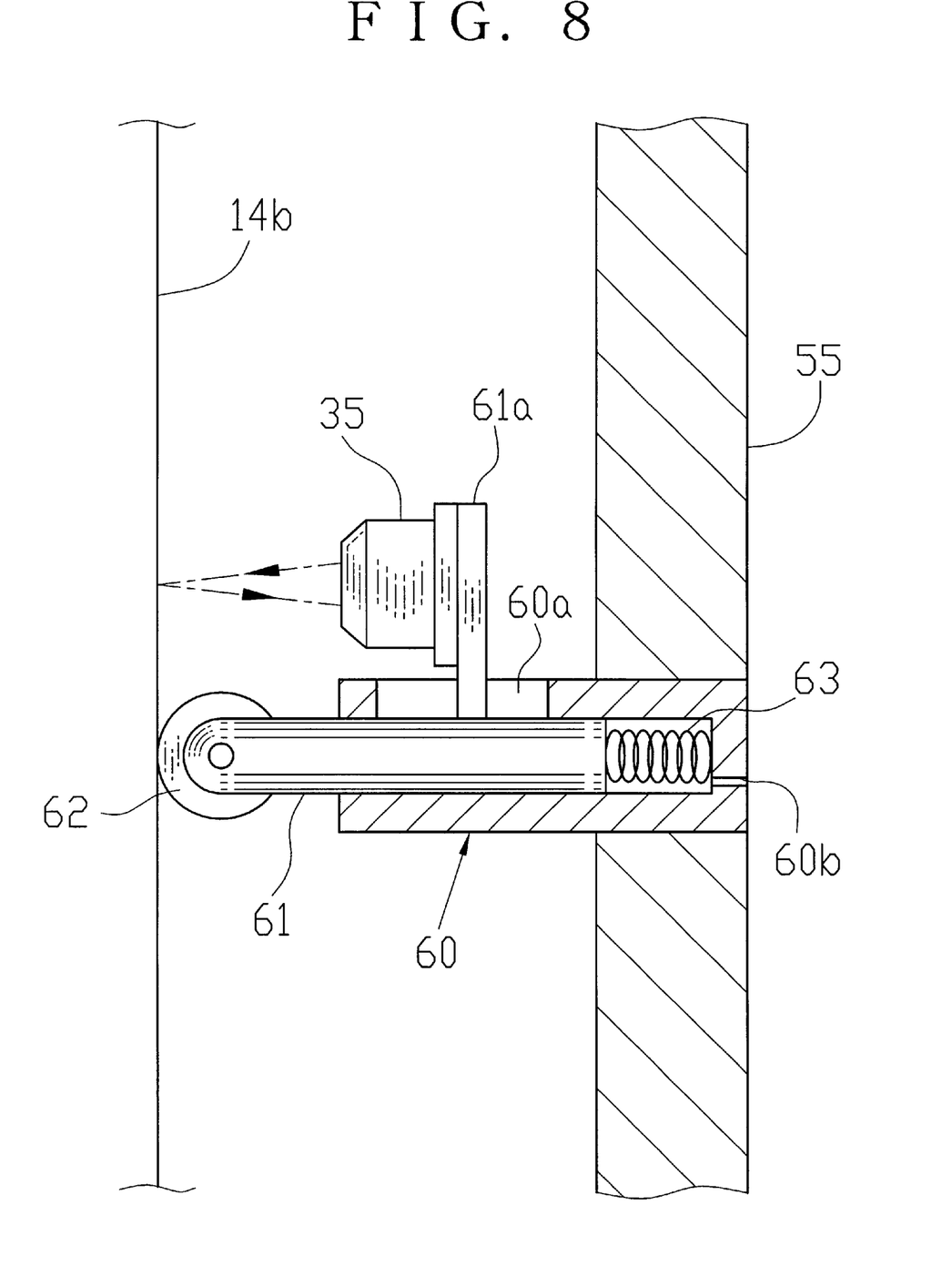
FIG. 8 is an explanatory view in elevation, illustrating a structure for keeping the reading sensor positioned at an unchanged distance.
Figure 9:
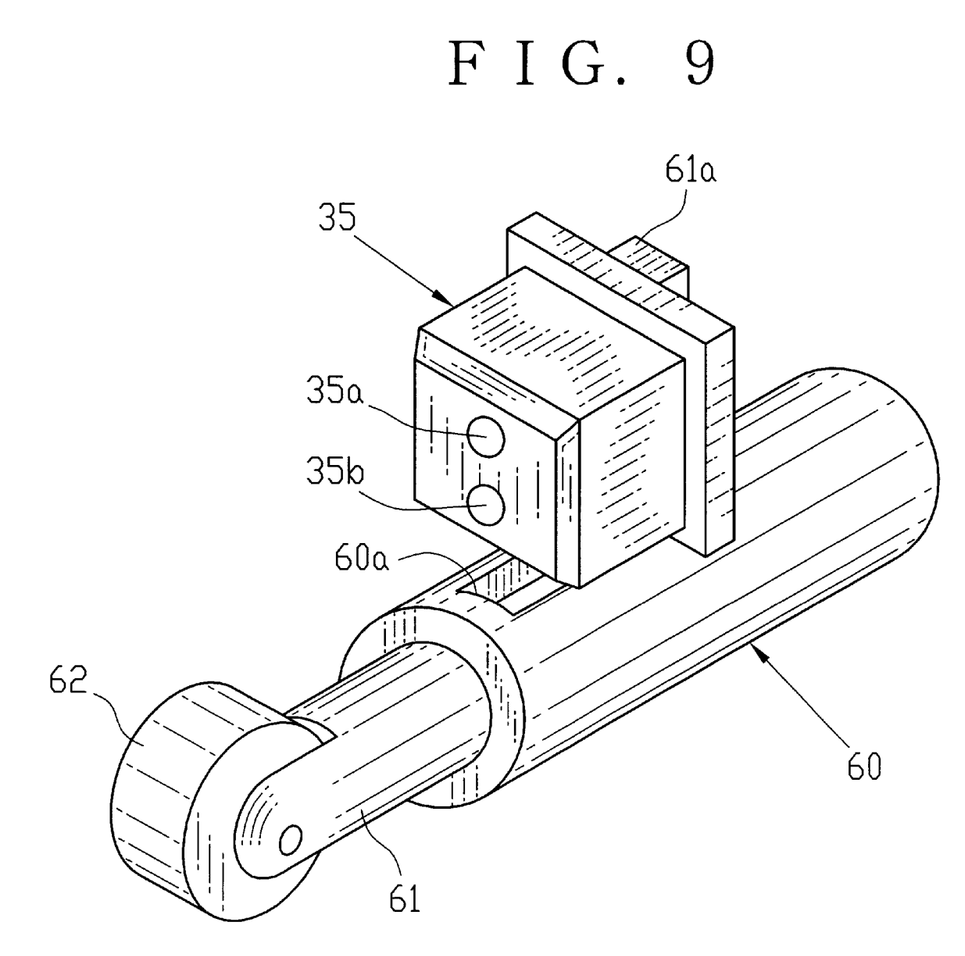
FIG. 9 is a perspective illustrating the structure of FIG. 8.

In FIGS. 7–9, a preferred supply magazine in which a sensor is settable at an unchanged distance from the end face of the tubular spool shaft. Elements similar to those of the above embodiment are designated with identical reference numerals. A sensor holder 57 is provided in the supply magazine to constitute the sensor shifter. A tubular portion 60 is formed with the sensor holder 57 to extend vertically, and has a closed rear end. A sliding rod 61 as a position regulator has a rear end that is inserted in the tubular portion 60. A guide roller 62 in the position regulator is disposed to an end of the sliding rod 61, and rotatable in contact with the first end face 14b of the tubular spool shaft 14. A coil spring 63 as bias mechanism is disposed inside the tubular portion 60, biases the rear end of the sliding rod 61, and keeps the guide roller 62 in contact with the first end face 14b no matter how the first end face 14b is deformed and offset from a regular level. An air hole 60b is formed in the tubular portion 60.

An arm 61a is formed with the sliding rod 61. A slot 60a is formed in the tubular portion 60 for protrusion of the arm 61a, to which the code sensor 35 is secured. The code sensor 35 is constituted by a light projector 35a and a light receiver 35b.

A potentiometer 73 as position detector is secured to the first support plate 26 for detecting a shifted position of the sensor holder 57. A sensing pin 74 of the potentiometer 73 has an end contacting an upper end of the sensor holder 57. As the sensing pin 74 is shifted by movement of the sensor holder 57, an output level of the potentiometer 73 changes according to a remaining amount of the recording paper 15. It is to be noted that the end of the sensing pin 74 may be set in contact with the first or second roll holder 19 or 18 to detect the position of those for measuring the remaining amount of the recording paper 15. Furthermore, a distance sensor of an optical type may be used instead of the potentiometer 73.

There is a printed circuit board 58, to which a connection cable 75 connects the potentiometer 73. The printed circuit board 58 includes a circuit for processing an output from the code sensor 35. Also, an A/D converter 76 is included in the printed circuit board 58 for digitally converting the output from the code sensor 35. The printed circuit board 58 is connected to the connector 23 by the connection cable 37.

There is a connector 77 in a roll chamber in the printer. The connector 23 is connected with the connector 77 upon insertion of the supply magazine 3 into the roll chamber. A system controller 80 for overall control of the printer is connected with the connector 77. A liquid crystal display (LCD) panel 82 is connected with the system controller 80 by means of an LCD driver 81. Also, a thermal head 84 is controllable by the system controller 80 by means of a printing control unit 83. The printer body accommodates the system controller 80, the LCD driver 81, the printing control unit 83 and the thermal head 84. The LCD panel 82 is disposed in an outer wall of the printer body in an observable manner.

The operation of the present embodiment is described now. When the recording paper roll 12 is inserted in the magazine body 5, the guide roller 62 is kept by the coil spring 63 in contact with the first end face 14b of the tubular spool shaft 14. The code sensor 35 is kept at the unchanged distance from the first end face 14b by means of the arm 61a. When the supply magazine 3 with the recording paper roll 12 is loaded in the chamber in the printer, the connector 23 becomes connected with the connector 77.

Upon a start of printing, the drive mechanism in the printer causes the supply roller 45 to make clockwise rotations as viewed in FIG. 7. The recording paper roll 12 rotates in the counterclockwise direction. During the rotation, the code sensor 35 reads the code 50 at the first end face 14b in the tubular spool shaft 14 as depicted in FIG. 6. Even if the recording paper roll 12 is set obliquely or if the tubular spool shaft 14 has an irregular length, the reading operation can be stable because of the unchanged distance between the first end face 14b and the code sensor 35. The sensor signal is sent through the printed circuit board 58, the connection cable 37, the connectors 23 and 77 to the system controller 80 in the printer, and is used by the printing control unit 83 to control driving of the thermal head 84.

Furthermore, an output from the potentiometer 73 is converted by the A/D converter 76 into a digital signal, transmitted by the connection cable 37 and the connectors 23 and 77, and sent to the system controller 80. In response to the output from the potentiometer 73 in the digitalized form, the system controller 80 causes the LCD driver 81 to drive the LCD panel 82, in which an amount of the remainder of the recording paper 15 is indicated. For this indication, the amount is expressed in the length, or the a numerically expressed form of which the unit is, for example, a size of a single print of the A4 size or postcard size. When the remainder of the recording paper 15 comes down to zero, then letters of "no paper" or the like are indicated in the LCD panel 82 in a blinking manner. Also, the thermal head 84 is inhibited from being driven.

Figure 10:
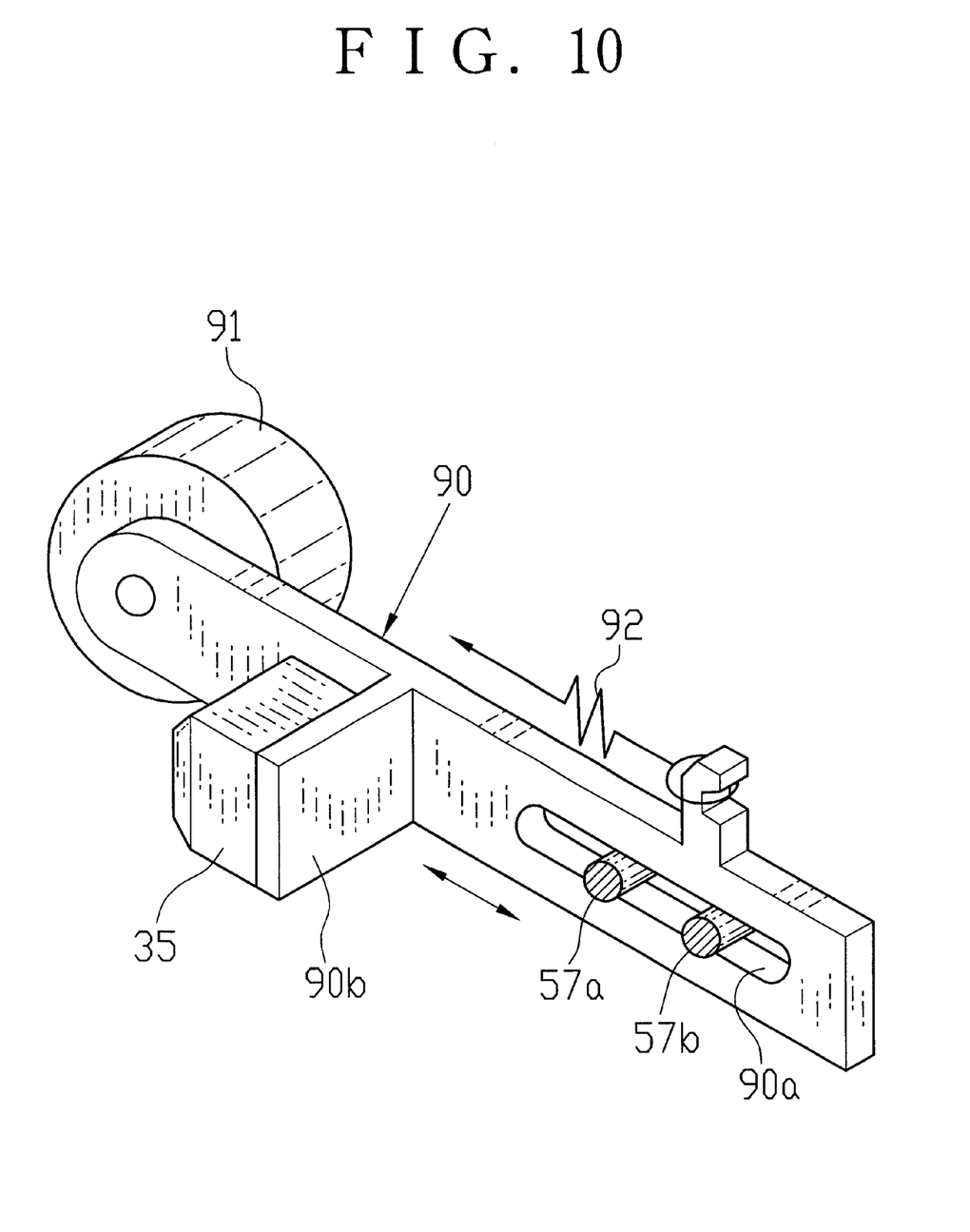
FIG. 10 is a perspective illustrating another preferred position keeping structure with pins and a slot.

In FIG. 10, another preferred embodiment is depicted, in which a sliding plate 90 or lever as a position regulator is movable toward and away from the sensor holder 57. A guide slot 90a included in a guide mechanism is formed in the sliding plate 90. Guide pins 57a and 57b included in the guide mechanism projects from the sensor holder 57, and are inserted in the guide slot 90a. A guide roller 91 included in the position regulator is rotatable at an end of the sliding plate 90. An arm 90b is formed with a side of the sliding plate 90, is oriented perpendicularly to a moving direction of the sliding plate 90, and supports the code sensor 35. A coil spring 92 as bias mechanism biases the sliding plate 90 toward the first end face 14b for contact of the guide roller 91 to the first end face 14b.

This being so, the sliding plate 90 is kept movable by the guide pins 57a and 57b in a direction that is perpendicular to the first end face 14b. The sliding plate 90 is biased by the coil spring 92 toward the first end face 14b to press the guide roller 91 against the first end face 14b. The sliding plate 90 can move according to a state of the first end face 14b, for example, its inclination or curvature in a concave or convex manner. The distance of the code sensor 35 to the first end face 14b is kept unchanged.

In the above embodiments, the supply roller 45 is disposed in the supply magazine 3 to rotate in contact with the recording paper roll 12 for supply of the recording paper 15 toward the outside of the supply magazine 3. Alternatively, a printer may have the supply roller 45 instead of disposing the supply roller 45 in the supply magazine 3. For such a construction, an opening is formed in the supply magazine 3 for receiving the supply roller 45. It is preferable that a shutter mechanism is disposed at the opening, for shutting the opening before inserting the supply magazine 3 into the roll chamber in the printer, and for being actuated to open the opening after the insertion or in response to the insertion.

In the above embodiments, the code 50 in the first end face 14b of the tubular spool shaft 14 is a type of a train of small circles arranged on an arc. Alternatively, the code 50 may be a rotary bar code in which bars are extended radially relative to the center of the tubular spool shaft 14 and arranged on an arc defined about the center. Also, the recording paper roll 12 can be rotated backwards shortly before operation of supply the recording paper 15 for the purpose of absorbing looseness of the recording paper roll 12, and then can be rotated forwards to supply the recording paper 15. It is possible that the code 50 is read while the recording paper roll 12 is rotated backwards. In the above embodiments, the code 50 is read at each time of printing operation. Alternatively, it is possible to read the code 50 at each time that the supply magazine 3 is removed and then reinserted in the printer.

In the above embodiment, the guide roller 62, 91 is used for contact with the first end face 14b in the tubular spool shaft 14 in a rotatable manner. However, a ball may be used, and supported in a rotatable manner. Furthermore, the guide roller 62, 91 or the ball may contact the end face of the recording paper roll 12 in addition to the first end face 14b.

In the above embodiments, the inclined surface 56a is formed to extend from a point on the cylindrical surface of the holder core 19a to a point at an end of the first flange 56, so there is no area in which the first flange 56 contact the first end face 14b. Alternatively, the first flange 56 may have first and second flange portions. The first flange portion may erect flatly from the cylindrical surface of the holder core 19a, and contact the first end face 14b of the tubular spool shaft 14 with a small area. The second flange portion may extend from the first flange portion, and may be inclined away from the first end face 14b in a radial direction so as to facilitate reading of the code 50.

In the above embodiments, the first and second roll holders 19 and 18 are engaged with each other within the tubular spool shaft 14. Furthermore, the first and second roll holders 19 and 18 may be not engaged with each other, and may be simply inserted in first and second ends of the tubular spool shaft 14. The first roll holder 19 in this combination of the first and second roll holders 19 and 18 still has the inclined surface 56a at the first flange 56. In the above embodiments, only the first roll holder 19 has the inclined surface 56a. However, it is possible for both the first and second roll holders 19 and 18 to have flanges with inclined surfaces.

In the above embodiments, the holder cores 18a and 19a are connected together by coupling the latch claw portions 53 and 54 with the groove 51a. However, at least one ball may be used instead of the latch claw portions 53 and 54, and may be biased by a spring for tight engagement with the groove 51a. Also, instead of the latch claw portions 53 and 54 and the groove 51a, it is possible to use a mechanism for raising friction of an inner surface of the tubular spool shaft 14 upon insertion of the holder cores 18a and 19a into the tubular spool shaft 14, so as to secure the holder cores 18a and 19a tightly to the tubular spool shaft 14 without a drop. An example of such a mechanism is a push member, disposed in one of the holder cores 18a and 19a, biased by a spring toward the inner surface of the tubular spool shaft 14, for pushing the tubular spool shaft 14 with friction. Also, a surface of the push member may be finished with corrugation for high friction.

In the above embodiments, the holder cores 18a and 19a are secured to the bearing members 18b and 19b in a rotatable manner. The bearing members 18b and 19b are secured to the guide cutouts 25a and 26a in a slidable manner. Alternatively, the bearing member 18b may be formed with the holder core 18a as one piece, and the bearing member 19b may be formed with the holder core 19a as one piece. The bearing members 18b and 19b may be both slidable and rotatable in the guide cutouts 25a and 26a. In this structure, it is preferable that the handles 21 and 22 should be eliminated.

In the above embodiments, the guide cutouts 25a and 26a come through the support plates 25 and 26. However, the guide cutouts 25a and 26a may be simple recesses formed in inner surfaces of the support plates 25 and 26.

Also, the recording paper 15 in the recording paper roll 12 for being contained in the supply magazine 3 of the invention may be a recording sheet or film of a continuous shape or strip shape. For example, the recording paper 15 may be photographic paper to be used in a photographic printer.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A supply magazine for containing a recording material roll including a tubular spool shaft having first and second end faces, continuous recording material wound about said tubular spool shaft in a roll form, and a code formed in at least said first end face, said supply magazine comprising:

at least one roll holder for being secured to said spool shaft;

first and second support plates for supporting said roll holder, and for setting said roll holder movable in a first direction according to a decrease in a diameter of said recording material roll in use of said recording material;

a code sensor for reading said code from said first end face; and a sensor shifter for moving said code sensor in said first direction with said roll holder, to oppose said code sensor to said first end face irrespective of said diameter.

2. A supply magazine as defined in claim 1, further comprising a supply roller for rotating in unwinding and winding directions and for receiving an outside of said recording material roll moving in said first direction, to feed said recording material.

3. A supply magazine as defined in claim 2, wherein said at least one roll holder comprises first and second roll holders each of which includes:

a holder core for being fitted in respective openings in said first and second end faces; and a bearing portion for securing of said holder core thereto in a rotatable manner.

4. A supply magazine as defined in claim 3, wherein said first and second support plates include first and second guide cutouts for extending in said first direction, to receive insertion of said first and second bearing portions in a manner slidable and rotationally stationary.

5. A supply magazine as defined in claim 3, wherein said sensor shifter includes:

a sensor holder for supporting said code sensor; and a depression portion, formed with said first roll holder, for moving said sensor holder in said first direction.

6. A supply magazine as defined in claim 5, wherein said sensor shifter further includes a guide shaft for extending in said first direction, and for keeping said sensor holder slidable thereon.

7. A supply magazine as defined in claim 6, further comprising:

a first spring member for biasing said sensor holder in reverse to said first direction; and a push mechanism for pushing respectively said first and second roll holders in said first direction in a stronger manner than said first spring member.

8. A supply magazine as defined in claim 7, further comprising:

a magazine body provided with said first and second support plates secured thereto;

a magazine lid for openably closing said magazine body;

wherein said pushing mechanism discontinues pushing said first and second roll holders when said magazine lid is open.

9. A supply magazine as defined in claim 8, wherein said guide shaft is secured to said first support plate.

10. A supply magazine as defined in claim 1, further comprising a position regulator for keeping said code sensor at a predetermined distance from said first end face.

11. A supply magazine as defined in claim 10, wherein said position regulator includes:

a guide roller or ball for contacting said first end face or one end face of said recording material roll;

a sliding member, secured to said sensor holder in a slidable manner, for supporting said code sensor, said sliding member having an end for securing of said guide roller or ball thereto.

12. A supply magazine as defined in claim 11, wherein said position regulator further includes a spring member for biasing said sliding member toward said first end face.

13. A supply magazine as defined in claim 1, further comprising:

a position detector for measuring a shifted position of said sensor holder or said first roll holder with reference to said first direction; and an information generator for generating information of a remaining amount of said recording material according to said shifted position.

14. A supply magazine as defined in claim 13, wherein said position detector includes a potentiometer.

15. A supply magazine as defined in claim 1, wherein said at least one roll holder comprises first and second roll holders each of which includes:

a holder core for being fitted in respective openings in said first and second end faces; and a bearing portion for securing of said holder core thereto in a rotatable manner;

further comprising a first flange, formed to project from at least said holder core of said first roll holder, opposed to said first end face, for preventing said tubular spool shaft from offsetting in said axial direction;

wherein said first flange includes an inclined face for avoiding interference with reading of said code sensor.

16. A supply magazine as defined in claim 15, wherein said inclined face is so inclined as to decrease a flange diameter according to closeness to said first end face.

17. A supply magazine for containing a recording material roll including a tubular spool shaft having first and second end faces, continuous recording material wound about said tubular spool shaft in a roll form, and a code formed in at least said first end face, said supply magazine comprising:

first and second roll holders, including first and second holder cores and first and second bearing portions, said first and second holder cores being fitted partially in respective openings in said first and second end faces, said first and second bearing portions adapted for securing of said first and second holder cores thereto in a rotatable manner;

first and second flanges, formed to project from said first and second roll holders, opposed to said first and second end faces, for preventing said tubular spool shaft from offsetting in an axial direction;

a code sensor for reading said code from said first end face; and an inclined face, formed in said first flange, for avoiding interference with reading of said code sensor.

18. A supply magazine as defined in claim 17, wherein said inclined face is so inclined as to decrease a flange diameter according to closeness to said first end face.

19. A supply magazine as defined in claim 18, further comprising:

a magazine body, having a magazine opening, for accommodating said recording material roll, said first and second roll holders and said code sensor;

a magazine lid for openably closing said magazine opening.

20. A supply magazine as defined in claim 19, further comprising:

first and second support plates disposed inside said magazine body;

first and second guide cutouts, formed in said first and second support plates, for extending in a first direction, for sliding said first and second bearing portions according to a decrease in a diameter of said recording material roll in use of said recording material; and a sensor shifter for moving said code sensor in said first direction in sliding of said first and second bearing portions in said first and second guide cutouts, to set said code sensor opposed to said first end face.

* * * * *